United States Patent

[11] 3,617,428

| | | |
|---|---|---|
| [72] | Inventor | Robert P. Carlson<br>Springfield, Mass. |
| [21] | Appl. No. | 855,666 |
| [22] | Filed | Sept. 5, 1969 |
| [45] | Patented | Nov. 2, 1971 |
| [73] | Assignees | Alton Box Board Company<br>Alton, Ill.;<br>Monsanto Company<br>St. Louis, Mo. |

[54] CORRUGATED FIBERBOARD
7 Claims, 2 Drawing Figs.

[52] U.S. Cl. ................................................ 161/133,
117/155 L, 161/264, 260/29.3, 260/51.5,
260/839, 260/840
[51] Int. Cl. ..................................................... B22b 3/28,
B32b 27/42, C08g 37/18
[50] Field of Search........................................... 117/155 L;
161/133, 264; 260/29.3, 51.5, 840, 839

[56] References Cited
UNITED STATES PATENTS

| | | | |
|---|---|---|---|
| 3,062,699 | 11/1962 | Raphael et al. ................ | 161/264 X |
| 3,135,648 | 6/1964 | Hawkins........................ | 161/249 |
| 3,223,668 | 12/1965 | Stalego.......................... | 260/840 X |
| 3,306,864 | 2/1967 | Lang et al. .................... | 260/840 X |
| 3,324,065 | 6/1967 | Pierce ........................... | 260/29.6 BM |
| 3,331,885 | 7/1967 | Rider et al. ................... | 260/826 |
| 3,371,004 | 2/1968 | Kennedy ....................... | 260/29.6 BM |
| 3,380,877 | 4/1968 | Smucker et al. .............. | 260/51.5 X |
| 3,431,162 | 3/1969 | Morris........................... | 161/133 |
| 3,444,119 | 5/1969 | Le Blanc ....................... | 260/29.3 |

Primary Examiner—Robert F. Burnett
Assistant Examiner—Stephen M. Hoffman
Attorneys—John W. Klooster, Arthur E. Hoffman, Richard W. Sternberg and Neal E. Willis ABSTRACT: Corrugated fiberboard which resists deterioration in strength when in the presence of moisture or water. Such board is made by treating medium and, optionally, liner members with an aminoplast containing phenol-aldehyde resole resin composition and thereafter bonding corrugated medium to liner members with a thermoplastic waterproof adhesive system containing substantially fully hydrolyzed polyvinyl alcohol.

INVENTOR
ROBERT P. CARLSON

BY *John W. Klooster*
ATTORNEY

CORRUGATED FIBERBOARD

IMPROVED CORRUGATED FIBERBOARD

BACKGROUND

Corrugated fiberboard has been used for many years and for various purposes, but is well known to have poor wet strength properties. However, for some time, manufacturers of corrugated fiberboard have tried to remedy such inherent deficiencies in wet strength (as determined, for example, using post-moisture exposure crush resistance comparative measurements) by impregnating the paper sheeting used in making such board with various polymeric substances including phenolic resins and then using a waterproof thermosetting starch/formaldehyde based adhesive to bond together the resin-treated medium and liner members. So far as is known, however, such efforts have generally not been successful in producing corrugated fiberboard of commercially useful quality; see, for example, Koning, Jr. and Fahey of the U.S. Forest Products Laboratory reported in "Package Engineering," Vol. 10 No. 10, Oct. 1965 at pages 130 through 139.

Such previous efforts to improve wet strength using phenol-aldehyde paper treating resins have generally not been successful because of problems, such as:

A. the prolonged and excessively high temperatures required for phenol-aldehyde resin curing (preventing the use in effect of phenolic resins on the high-speed machinery conventionally commercially used to make corrugated fiberboard);

B. the inability of conventional aqueous phenol-aldehyde resin systems to uniformly penetrate base paper stock during high-speed treating;

C. the embrittlement commonly associated with paper stock following phenol-aldehyde resin treatment and incorporation into corrugated fiberboard; and the like.

D. the lack of compatibility and good bonding between phenol-aldehyde thermoset-resin treated base stock and adhesive systems used to bond such resin treated medium and liner sheets together into corrugated fiberboard; and the like.

In addition, such previous efforts using such treating resins and thermosetting formaldehyde-based adhesives have not been commercially practicable because of such problems as the amount of heat required to increase the adhesive value of a starch/formaldehyde adhesive system to an acceptable level for boxboard manufacture sometimes causes a premature thermosetting of the resin in the resin treated medium or even liner members.

It has surprisingly and unexpectedly now been discovered that such prior art problems can be overcome when an aminoplast containing phenol-aldehyde paper-treating resin system and a particular class of polyvinyl alcohol adhesives are used in conventional high-speed corrugated fiberboard manufacturing techniques to make corrugated fiberboard. The product board has among other desirable properties generally superior post-moisture exposure crush resistance.

A significant advantage associated with the present invention is that the resin system used for impregnation of the base paper stock used in such fiberboard manufacture requires significantly higher temperatures to thermoset than those needed to set the adhesive system employed, thereby making it possible if desired to maximize adhesive bond strength in a product carton blank by first setting the adhesive used to make the board, then forming the blank from the board, and finally curing the resin in the paper used to make the board rather than curing adhesive and resin at the same time. Consequently, one may first manufacture corrugated fiberboard having good dry strength and flexibility characteristics, such as are desirable in further machine processing of corrugated fiberboard into manufactured articles like box blanks, etc., and then process such fiberboard into such manufactured articles. Thereafter, the impregnated resin can be thermoset, and the resulting corrugated fiberboard accordingly stiffened and rigidified, by raising the so-manufactured articles to temperatures high enough to thermoset such impregnated resin.

The minimal heat input requirements associated with making the products of this invention are particularly valuable when one is producing board such as double or triple wall corrugated board, or board having heavy liner members, where poor heat transfer characteristics of the product board require the use of slow machine speeds to effectuate thermosetting of adhesive. Thus, if low heat is required for setting of adhesive, high machine operating speeds can be employed. One consequence of this reduced heat requirement is that lower liner preheat temperatures may be used in board manufacture. This means, among other things, that a liner can be preheated with lower temperature-softening thermoplastic coating polymers, such as waxes or polyolefins, and still be used to make board at high speed with minimum machine operating problems.

A particularly significant advantage of the present invention is that one can use an adhesive which has "quick tack" or "green strength" such that the adhesive can be employed with corrugating machines operating at maximum speeds with minimum heat applied to achieve bonding between medium and liner members and still produce a rigid-when-wet corrugated container board.

The thermoplastic adhesive compositions employed in the present invention enable one to produce product corrugated board which is not only rigid when wet but which has a degree of flexibility in the glue line which makes the product board tough without being brittle.

Other and further advantages will be apparent to those skilled in the art from the present teachings.

SUMMARY

The present invention relates to a novel corrugated fiberboard construction adapted to have good wet strength and crush resistance and to certain novel resin-treated medium and liner sheet members useful as intermediates for the manufacture of such fiberboard. For present purposes, wet strength and crush resistance of corrugated fiberboard may be conveniently measured comparatively using flat crush resistance data measured on corrugated fiberboard before and after moisture exposure by means of ASTM Test Procedure No. D-1225-54.

Sheet members adapted for use in this invention as medium in the manufacture of the corrugated fiberboard utilize paper ranging in thickness from about 7 to 15 thousandths of an inch and having basis weight of from about 25 to 36 pounds per 1,000 sq. ft. Such a paper has been treated with from about 5 to 15 weight percent (dry weight basis) of a phenol-aldehyde resin system containing an aminoplast. The paper after such resin system treatment has a total volatiles content of from about 3 to 10 weight percent.

The terms "treated," "treating," or "treatment" as used herein are generic to both impregnation and coating of the substrate paper itself; such can be accomplished in any convenient, conventional manner, as hereinafter further detailed and illustrated.

Sheet members adapted for use in this invention as liners in the manufacture of the corrugated fiberboard utilize paper ranging in thickness from about 5 to 30 thousandth of an inch and having basis weights of from about 25 to 120 pounds per 1,000 sq. ft. Such a paper has been treated with from about 2 to 10 weight percent (dry weight basis) with such an aminoplast-containing phenol-aldehyde resin system, and such paper after such treatment has a total volatiles content of from about 3 to 10 weight percent. Liner sheet members used in the corrugated fiberboard of this invention need not be, but preferably are, so treated with such an aminoplast-containing phenol-aldehyde resin system.

A corrugated fiberboard construction of this invention employs a treated medium, as above described, and a liner (preferably, though not necessarily, a treated one, as above described). Each such medium is corrugated and positioned adjacent to a liner member on one side thereof (preferably there is a liner in each side of a corrugated medium). Each liner is bonded to its adjoining medium at positions of mutual contact therebetween with a polyvinyl alcohol based adhesive system which is interposed between such a liner sheet member and such a medium sheet member at such positions of mutual contact (typically the tips of the corrugated medium flutes).

The aminoplast-containing phenol-aldehyde resin system used in this invention comprises:

A. from about 1 to 5 weight percent (total dry system basis) of an ammonium salt of a mineral acid, and B. the balance up to 100 weight percent (same basis) of an aminoplast-containing resin, C. said aminoplast-containing resin being selected from the group consisting of:

1. condensation reaction products of phenol, formaldehyde, and at least one aminoplast selected from the group consisting of urea, melamine, and dicyandiamide, and 2. compositions comprising a phenol-formaldehyde resole resin and at least one such aminoplast, and D. said aminoplast-containing resin being further characterized by having:

1. a mol ratio of combined formaldehyde to phenol ranging from about 1.0 to 3.0, 2. a total nitrogen content ranging from about 3 to 20 weight percent (based on total dry resin weight), and 3. a water solubility such that at least about a 30 weight percent aqueous solution of resin solids can be prepared.

Aminoplast containing phenol-aldehyde resins as described above are well known to the prior art. Condensation reaction products of phenol-formaldehyde and at least one aminoplast may be made, for example, by techniques taught by Mestdagh et al. in U.S. Pat. No. 3,004,941. Aminoplast modified resins of phenol and formaldehyde are preferred.

Thus, such a modified phenol-formaldehyde resin useable in this invention can be prepared by first condensing from about 1.5 to 5 mols of formaldehyde per mol of phenol. Preferentially, the condensation is accomplished using an alkaline catalyst. The condensation is continued until a predetermined free formaldehyde content is reached, as determined, for example, by the hydroxylamine hydrochloride test. A suitable free-formaldehyde content is about 9–15 weight percent based on total weight of starting reactants. The formaldehyde used in the starting reactants can be in the ratio range of about 1.5 to 5 mols per mol of phenol, and, preferably, ranges from about 1.5 to 3.5 mols of formaldehyde per mol of phenol. Such aqueous condensation product of phenol and formaldehyde, having the excess formaldehyde is cooled to about 30° to 50° C. The aminoplast (dicyandiamide, melamine, or urea, or mixture thereof) is then added in such a proportion that the ratio is generally, and, preferably, about 1 mol of the aminoplast to about 0.5 to 2.0 mols of formaldehyde in the resulting formaldehyde condensation product with dicyandiamide, melamine, and/or urea, and more preferably, about 1.2 to 1.6 mols of formaldehyde. For example, when employing a mixture of dicyandiamide, melamine, and urea, the mixture can consist of from about 10 to 90 weight percent of dicyandiamide, and, correspondingly, about 90 to 10 weight percent of urea.

Alternatively, the process for preparing an aminoplast modified phenol-formaldehyde resin for use in this invention can be accomplished by reacting dicyandiamide, melamine, or urea, or mixture thereof, with formaldehyde in the presence of an alkaline catalyzed reaction product of phenol-formaldehyde having no excess free formaldehyde. This process can be initiated by first reacting phenol with formaldehyde under alkaline catalyzed conditions to provide a water-dilutable condensate of phenol-formaldehyde having no free formaldehyde. The ratio of formaldehyde to phenol, and of aminoplast to formaldehyde remains as above indicated.

Other methods known to the art can be used for preparing such a modified resin for use in this invention. Typically, such methods involve the separate preparation of a phenol-aldehyde condensate resin composition which is initially not only water soluble but also water dilutable to the extent desired. The dicyandiamide, melamine and/or urea formaldehyde condensation product, as those skilled in the art readily appreciate, can be prepared separately by conventional techniques in the from of a resin which is typically not only water soluble, but also water dilutable to the extent desired. Such a separately prepared formaldehyde condensation product with dicyandiamide, melamine or urea can have a mol ratio of dicyandiamide melamine and/or urea to aldehyde of from about 0.5 to 5. The resin is then added to the preformed phenol-aldehyde resin. Preferably, aminoplast modified phenol-aldehyde resins for use in this invention have a total combined nitrogen content ranging from about 3 to 12 weight percent (dry weight basis), and, in general, this nitrogen content is less than about 20 weight percent.

A suitable phenol-aldehyde resole resin system can be made by any conventional procedure known to the art of phenolic resins. For example, one convenient and preferred procedure involves condensing usually at temperatures ranging from about 50° to 80° C. phenol and formaldehyde in the above-indicated desired mol ratio under aqueous liquid phase conditions in the presence of a basic catalyst, such as an alkali metal hydroxide such as sodium hydroxide or an alkaline earth hydroxide such as calcium hydroxide, a trialkyl amine such as triethylamine, and the like until a desired end point is reached, such as, for example, a free formaldehyde content which is less than about 3 to 10 weight percent.

The product is a phenol-formaldehyde resole resin in aqueous solution having a total solids content of from about 30 to 70 weight percent. Usually and preferably, the resin solution is prepared as a concentrate of from about 40 to 55 weight percent solids (based on the total solution weight) which may be conveniently and preferably diluted down before use to a solids content of from about 5–50 weight percent. Preferably, the solids content of the concentrate ranges from about 45–60 weight percent and preferably the solids content of the diluted working solution ranges from about 15–45 weight percent.

For in in the products of this invention, it has been found that this resole resin should preferably not be advanced in manufacture beyond the point where it has a water solubility such that about a 55 weight percent solids in aqueous solution thereof can be prepared (preferably about 30 weight percent). Also, it has been found that this resole resin should have a methylol content per aromatic ring of from about 0.5 to 3 (preferably from about 1 to 2.5) as determined, for example, by NMR measurements. If such resin is more advanced, (i.e. has a high molecular weight) than such a solubility as above indicated, or if such resin has a different methylol content than that above indicated, then it appears to have undesirable paper-treating characteristics, especially at the high application speeds conventionally employed for paper transport in the manufacture of corrugated fiberboard, for purposes of making the improved products of this invention. It will be appreciated by those skilled in the art that, in general, treatment of paper with resin will usually, as a matter of convenience, be accomplished as a separate, preliminary operation before boxboard manufacture is undertaken.

In addition, it has been found that this resole resin should preferably have a pH of from about 5.6 to 9.2 when in the form of an aqueous solution of about 35 weight percent total resin solids (preferably from about 7 to 8.5). Also, it has been found that this resole resin should preferably have an ash content of less than about 2.5 weight percent based on about a 35 weight percent aqueous solution of total resin solids (preferably less than about 0.7).

One convenient way in which to measure the ash content for present purposes is to take 2 grams of such an aqueous solution (35 percent solids) and deposit same in a crucible. The crucible is then heated to about 150° C. for about 2 hours to substantially completely cross-link the resin and evaporate free water and thereafter the crucible is exposed to about 540° C. for about 24 hours. Afterwards, the crucible is cooled to room temperature and measured to determine an increase in weight over starting empty weight thereby giving the ash content of the resin.

If such resin has a lower or higher pH, or a higher ash content, than those respectively above indicated, then it appears to have undesirable effects upon product paper treated therewith, especially in the properties of corrugated fiberboard made therefrom, for purposes of making the improved products of this invention.

In making the modified phenol-aldehyde resin systems for use in this invention, it is generally convenient and preferred to add the ammonium salt and the aminoplast (which when uncombined is preferably urea) in the respective amounts above indicated, each in the form of a finely divided powder, or even (preferably) already dissolved in water, to the diluted or partially diluted phenol-formaldehyde resole resin (just described). Such addition causes this pH of this product system to fall in the range from 0.8 to 6, as above described.

Sometimes in order to make the pH of the product phenol-aldehyde resin system low, yet within the indicated range, one may, if desired, add to a given resole resin solution, preferably diluted for use and with the ammonium salt and urea already dissolved therewith, amounts of a strong inorganic acid, such as hydrochloric, or the like, until the pH is lowered to some desired value; however, such an acid addition is generally not necessary owing to the presence of the ammonium salt which itself tends to produce a pH within the ranges indicated.

It is to be noted that, in a resin composition for use in this invention, the chemical composition of such an aminoplast phenol-aldehyde resin can itself vary. For example, although during the reaction of the condensates, the phenol, the dicyandiamide, the melamine, and/or the urea will preferentially react with the aldehyde, it is expected that certain other reaction products will also form during the condensation reaction. These products would be, for example, a phenol-dicyandiamide-formaldehyde reaction product. When employing a mixture of dicyandiamide and urea, a phenol-dicyandiamide-urea-formaldehyde reaction product can form as well as a mixture of phenol-dicyandiamide-formaldehyde, phenol-dicyandiamide-urea-formaldehyde, and phenol-urea-formaldehyde reaction products. It is understood that these reaction products would only exist in minor amounts with the predominant portion of the condensation reaction products being phenol-formaldehyde and dicyandiamide-formaldehyde, or mixtures of dicyandiamide-formaldehyde and urea-formaldehyde. In general, the preparation of aminoplast modified phenol-aldehyde is known to those skilled in the art and does not form a part of the present invention. As those skilled in the art will appreciate, the aminoplast modified phenol-aldehyde resins used in the present invention are of the resole type since not only is the phenol-aldehyde condensation conducted under basic catalysis conditions, but also the aminoplast modification thereof is conducted under basic catalysis conditions.

As indicated above, the aminoplast modified phenol-aldehyde resole resin system and the ammonium salt are substantially completely dissolved in water at the time of paper treatment to make products of this invention. Minor amounts, say up to 5 to 7 weight percent of each such material may not be truly dissolved (especially in concentrates) but such deviations are within the contemplation of this invention in the word "substantially."

The aminoplast modified resin sued is conveniently and preferably prepared as a concentrate of from about 40 to 55 weight percent resin solids (based on total resin solutions weight). This concentrate is conveniently and preferably diluted down before use to a resin solids content of from about 5 to 50 weight percent. After the ammonium salt is added to and dissolved in the working solution, the solids content of a concentrate can range from about 45 to 60 weight percent typically and preferably the solids content of a diluted working solution ranges from about 15 to 45 weight percent.

For use in the present invention, it has been found that an aminoplast modified resin as described above should not be advanced in manufacture beyond a point where it has a water solubility such that about a 55 especially weight percent solids content aqueous solution thereof can be prepared (preferably about 30 percent). Preferably, this aminoplast modified resin has a methylol content per aromatic ring of from about 0.5 to 3 (more preferably from about 1 to 2.5) as determined, for example, by NMR measurements. If such resin is ore advanced (i.e. has a high molecular weight) than such a solubility as above indicated, or if such resin has a different methylol content than that above indicated, then it appears to have undesirable paper treating characteristics, especially at the high application speeds conventionally employed for paper transport in the manufacture of corrugated fiberboard, for purposes of making the improved products of this invention.

As indicated above, any ammonium salt of a mineral acid can be used in the present invention. Examples include ammonium halides (ammonium chloride preferred), ammonium nitrate, ammonium sulfate, ammonium phosphate and the like.

It is generally convenient and preferred to add the ammonium salt in the respective amounts above indicated to the solution of aminoplast modified resin in the form of a finely divided powder or, more preferably, already dissolved in water. It is preferred that at the time of use, the ammonium salt be substantially completely dissolved in the working solution. Preferably, the ammonium salt is not added to the resin solution until shortly before a medium or liner sheet member is to be treated therewith.

The polyvinyl alcohol adhesive systems employed in this invention are aqueous at the time of application to paper during corrugated fiberboard manufacture. Characteristically, such a system has a total solids content of from about 5 to 75 weight percent (about 5 to 35 weight percent being more preferred, generally) with the balance up to 100 weight percent being water. Such systems are well known to the prior art.

A polyvinyl alcohol adhesive system employed in this invention should have a water resistance sufficient to provide a postwater soak paper-to-paper fiber tearing bond. Such a water-resistant bond is conveniently measured after a 12 hour (24 hours preferred) room temperature water soak between two 42 pound basis weight sheets, each about 12 thousandths of an inch thick, both sheets being bonded together using an adhesive application rate equivalent to about 4 pounds adhesive solids per 1,000 sq. ft. of paper surface, and permitting such adhesive application to such a pair of sheets bonded together therewith to dry in air for about 24 hours before such test commences. The sheets are bonded together after wet adhesive application before any appreciable moisture loss of adhesive system water has occurred.

Typically, such an adhesive system contains (dry weight basis) from about 10 to 90 weight percent of polyvinyl alcohol, the exact amount employed in any given system depending upon individual circumstances and preferences, with the balance up to 100 weight percent being selected from the group consisting of supplemental binders, fillers, and adjuvants. The polyvinyl alcohol used characteristically has a molecular weight such that a 4 weight percent aqueous solution thereof has a viscosity at 20° C. of from about 5 to 125 centipoises with about 40 to 70 centipoises being preferred, about 55 to 65 centipoises being more preferred. Molecular weight affects solubility; thus, for example, by using a polyvinyl alcohol having a viscosity of about 60 c.p.s. one can prepare an aqueous solution having about 10 weight percent of polyvinyl alcohol therein if desired. In general, the polyvinyl alcohol used should be substantially fully hydrolyzed by which reference is had to the fact that a given polyvinyl alcohol used contains not more than about 5 weight percent of residual ester groups (based on total polymer dry weight), and preferably not more than about 2 weight percent. Characteristically, if a given polyvinyl alcohol is not so substantially fully hydrolyzed, then one does not prepare corrugated fiberboard having the desired wet strength and crush resistance characteristically associated with the products of this invention.

Typically, such an adhesive system can contain in addition to the polyvinyl alcohol supplemental binder materials, fillers, and adjuvants. In general, polyvinyl alcohol adhesive systems as above characterized can have the following compositions (based on 100 weight percent total for any given composition):

TABLE I

| Ingredient | Dry Basis Weight Percent |
| --- | --- |
| Substantially fully hydrolyzed polyvinyl alcohol | 10–90 |
| Supplemental binder | 0–50 |
| Fillers | 0–90 |
| Adjuvants | 0–50 |

Typical supplemental binders employed in the art include materials such as starch, dextrin and other synthetic polymeric materials such as phenol-aldehyde condensates, urea-formaldehyde condensates, polyvinyl acetate, polyacrylates, etc. Typical fillers employed in the art include materials such as clay, asbestos, mica, aluminum silicate pigments, wood floor, etc. Typical adjuvants employed in the art include:

A. fluidizing agents (such as urea, ammonium thiocyanate, etc.) and

B. complexing agents such as those which improve tack or improve water insolubility, such as boric acid and other boron compounds; or acidic metal salts having multivalent cations or the like.

Other adjuvants which can be employed as those skilled in the art will appreciate, include viscosity control aids; dyes and pigments; plasticizers and humectants; stabilizers; and bactericides, germicides, fungicides, etc., and the like. Typical patents describing the preparation of polyvinyl alcohol adhesives include U.S. Pat. No. 3,320,200; No. 3,371,004; and No. 3,135,648, and the like.

It is preferred to employ polyvinyl alcohol adhesive systems which have "quick tack" characteristics. Thus, using the "quick tack" measuring procedure described in column 3, lines 33 through 64 of U.S. Pat. No. 3,371,004, it is generally preferred to employ polyvinyl alcohol adhesive systems having a quick tack strength of about 2.7 to 10.1 grams per square centimeter. Quick tack is especially important in the single factor operation in corrugated board manufacture.

As those skilled in he art will appreciate, in the art of corrugated fiberboard, it has been conventional to employ as the medium sheet member semichemical paper. A corrugated medium member is formed by running a continuous sheet of medium through corrugating rolls. The medium, or "9 point" as it is sometimes called, takes on a wavelike shape as it passes between the corrugating rolls which mesh similar to gear teeth except that they are especially shaped to provide contours deemed best by a particular manufacturer for corrugations.

While the corrugating medium may be any of the cellulosic fibrous sheet materials conventionally used in the art, it is usually a sheet of about 26 pounds per 1,000 sq. ft. having a thickness of about 0.009 inch for all grades of combined board, but for purposes of the present invention, may be heavier or lighter for special requirements. Corrugating medium for example, is most commonly made from "semichemical" pulp, but is also made from straw, kraft, bogus, or chip (mixed, repulped fibers).

There are four conventional or standard sizes of corrugations as follows:

TABLE II

| Trade Designation | Number of Flutes per foot (approximate) | Thickness of Single Wall Board[1], in. |
| --- | --- | --- |
| A | 33–39 | 0.185–0.210 |
| B | 47–53 | 0.097–0.105 |
| C | 39–45 | 0.139–0.145 |
| E | 90–97 | 0.045–0.0624 |

[1] Approximate, depending on thickness of facings and also the particular corrugating rolls.

As with medium sheet members, any conventional liner sheet member can be used in the manufacture of the corrugated fiberboard of the present invention. Generally, the liner sheet members are made from sulfate kraft, but sometimes are made from other pulps.

Kraft for liner sheet members is usually made on a fourdrinier machine although some is made on a cylinder machine. Commonly, liner sheet members are made to standard weights, such as 26, 33, 38, 42, 47, 69, and 90 pounds per 1,000 sq. with thicknesses for such liner sheet members ranging from about 0.008 inch to 0.025 inch. Special linerboard can be used.

Details on the characteristics of medium sheet members and liner sheet members are well known to the corrugated fiberboard manufacturing industry. See, for example, Uniform Freight Classification Rule 41. The corrugation flutes can be combined using adhesive with facing or liner sheet member on one side only, called a single face board; when facings are on both sides of the corrugated medium sheet member, the product is sometimes called single wallboard or double face board. If there are two sheets of flutes with a facing on each side and one in the middle, the product is sometimes called double wallboard. If there are three layers of flutes with two outer liner facings and two inner liner facings between medium layers, the product is sometimes called triple wallboard.

The medium and liner can be treated with a resin system by immersion or any other convenient coating techniques. In a product corrugated fiberboard, only the medium need be resin treated, but preferably, both liner and medium sheet members are resin treated. For example, in liner treatment, a preferred method involves surface coating rather than immersion impregnation. Suitable coating procedures involve application to one surface of a liner with a roller coater, doctor blade, or other application mechanism. Such a procedure is particularly applicable when only one side of a liner is to be treated with a resin system because a coating procedure produces a differential impregnation or coating of the liner. Thus, the resin density is then greater relative to one surface of the resulting liner sheet than relative to the other (opposed) surface thereof. In general, it is preferred to uniformly coat medium sheet members with a resin system.

After treatment, a medium or liner sheet member is dried. Drying may, for example, be accomplished by passing such over or through a hot zone such that the temperature of the liner and/or the medium preferably does not exceed about 107° C. for more than about 0.1 second so as to avoid thermosetting the resin system. In drying, water is substantially completely removed without appreciable advancement or curing of the resin impregnated into the liner or medium sheet member. Thus, the percentage of volatiles in a treated liner or medium is controlled within the range of about 3 to 10 weight percent (total weight basis). For example, if the percentage of volatiles is reduced below such range, the resin system tends to cross-link and subsequently during corrugated fiberboard production reduced adhesive bonding to such a resin crosslinked medium or liner sheet tends to result, among other undesired results. On the other hand, for example, if the percentage of volatiles is left appreciably above such range, reduced adhesive bonding can likewise result. Also, outside of these ranges, a treated medium may be difficult to corrugate. Next, if not stored interveningly, a treated medium and a liner member are combined together. Commercially, a conventional corrugating machine may be used for this operation.

Although an adhesive system as described above is generally discontinuously but automatically applied only to the flutes of a corrugated treated medium when using machinery to make corrugated fiberboard of this invention, typical machine adhesive application rates range from about 3 to 12 pounds adhesive solids per 1,000 sq. ft. of product corrugated fiberboard but more or less than this amount can be employed. Adhesive application rates are not critical and can be widely varied without departing from the spirit and scope of this invention.

After adhesive application, corrugated medium sheet member(s) and liner sheet member(s) are duly combined together, as in a so-called corrugating machine, into board, the resulting fiberboard construction is subjected to temperatures of from about 120° to about 200° C. for times of from about 5 sec. to 5 minutes (140° to 180° C. for 5 to 30 seconds, preferred) to substantially set the adhesive. Such a product is converted to one of this invention by heating such to usually somewhat higher temperatures and for usually somewhat longer times sufficient to substantially completely thermoset the aminoplast containing phenol-aldehyde resin system in the treated paper of the board. Such setting of adhesive and thermosetting of treating resin can be accomplished in a single step, or in two steps all as hereinafter further described and illustrated. Preferred heating temperatures and times substantially completely set the adhesive, but do not do more than partially thermoset the treating resin thus forming an intermediate fiberboard product. When the adhesive is set and the treating resin only partially or even not at all the product fiberboard is generally more limber and pliable than when the resin is fully thermoset, which is desirable when the fiberboard product is to be made into box blanks. Preferably, a corrugated fiberboard construction of this invention has two liner sheet members.

Usually, and conventionally, a corrugated fiberboard of this invention is promptly made into box blanks following manufacture, though it is possible and convenient to store the corrugated fiberboard before same is used to make box blanks. Box (or carton) blank manufacture is well known to those of ordinary skill in the art and does not form part of this invention. Conventional box blanks manufacture includes scoring, slotting, and slitting.

If the corrugated fiberboard used to make the blanks does not have its resin treated medium and (optionally) liner members thermoset, a final blank processing step is performed. Thus, in such event, usually before a blank is formed into a box, but after scoring, slotting, and related operations are completed, a resulting carton blank is heated to a temperature and for a time sufficient to substantially completely thermoset the phenol-aldehyde resin system impregnated into the medium and (optionally) liner members of the board. In general, suitable temperatures for this purpose range from about 160° to 235° C. applied for times ranging from about 2 to 10 minutes (with higher temperatures requiring shorter cure times). Such a thermosetting increases the water resistance properties (e.g. crush resistance, as indicated above) of the corrugated fiberboard and blanks made therewith.

DESCRIPTION OF DRAWINGS

The invention is better understood by reference to the attached drawings wherein:

Turning to FIG. 1, there is seen a corrugated fiberboard construction of the present invention which is designated in its entirety by the numeral 10. Construction 10 is seen to incorporate a pair of facing liner sheet members 11 and 12. Interposed between liner sheet members 11 and 12 is a corrugated medium sheet member 13. The liner sheet members 11 and 12 are optionally treated with a aminoplast modified phenolic resin as taught herein above, while the medium sheet member 13 is treated with an aminoplast modified phenolic resin as taught hereinabove.

Figures 1, 2:
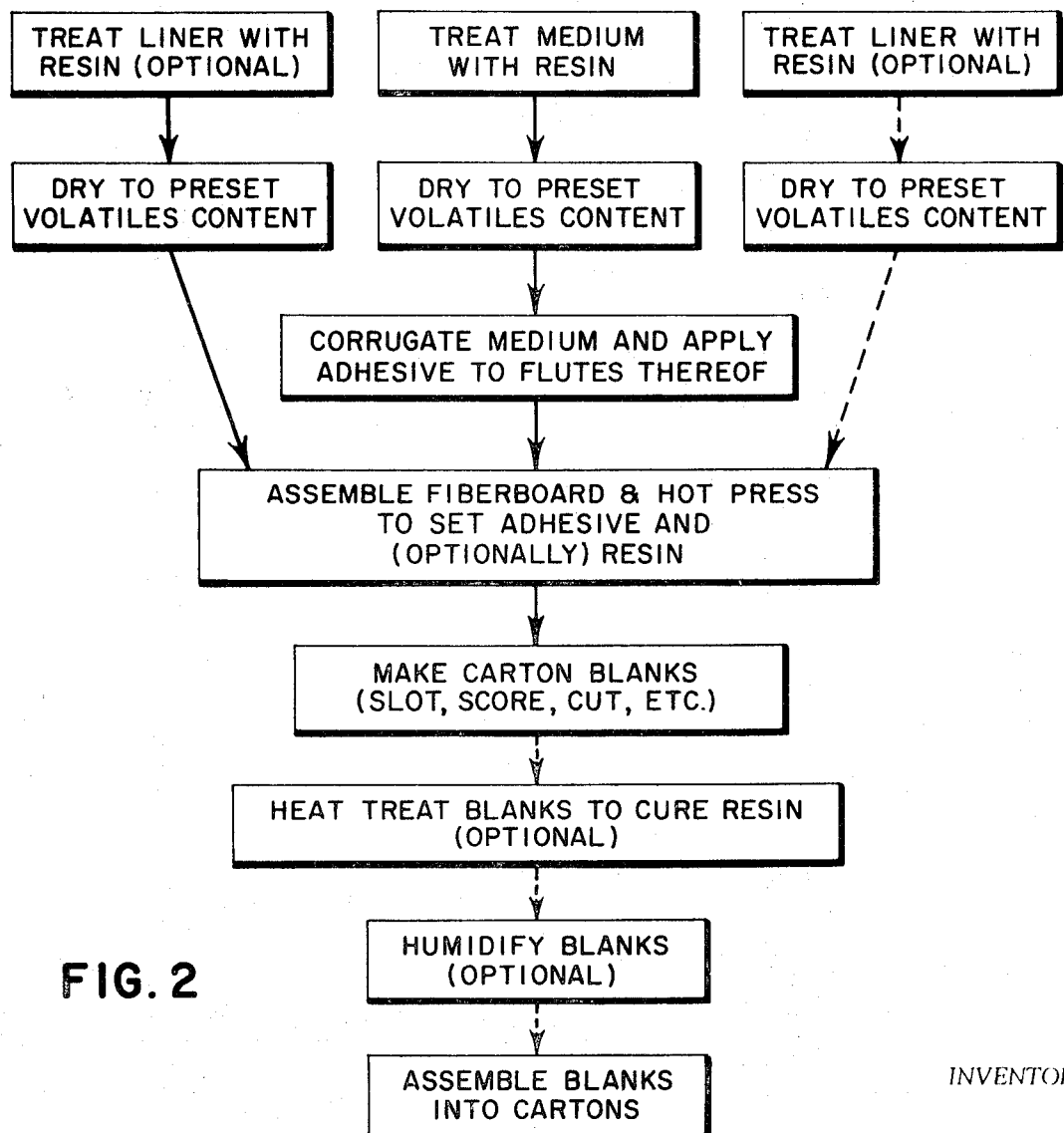
FIG. 1 is an enlarged, diagrammatic vertical cross-sectional view, some parts thereof broken away, of one embodiment of a corrugated fiberboard construction of this invention.
FIG. 2 is a simplified flow sheet illustrating the method of making corrugated fiberboard in accordance with the teachings of the present invention.

The tips of the flutes in the corrugated medium 13 are bonded to the adjacent faces of respective liner members 11 and 12 by means of a polyvinyl alcohol based adhesive system 14 as taught herein. Conventionally, the adhesive 14 is applied to the tips of the flutes during the combining operation of the medium 13 and the liners 11 and 12. After assembly, the construction 10 is heated as above described to set the adhesive 14 and produce the corrugated fiberboard 10.

Steps in one embodiment of a process for making a fiberboard 10 are shown in FIG. 2. This block diagram is believed to be largely self-explanatory particularly in view of the foregoing description so no detailed explanation thereof is given herein. Observe that FIG. 2 merely illustrates one mode of practicing the present invention and that deviations and variations in accordance with the teachings of the present invention are possible without departing from the spirit and scope of this invention.

The machine used to make corrugated fiberboard usually combines into a single operation the steps of corrugating the medium applying adhesives to the flutes thereof, and assembling the so-prepared medium with liner. Hot pressing of the so-assembled fiberboard is usually also accomplished in the same machine. Although the process embodiment of FIG. 2 discloses initially curing only the adhesive, it will be appreciated that it is convenient to practice the invention by curing both the adhesive and the resin for treatment of medium and liner members before exposing a product corrugated fiberboard to high-moisture conditions.

Those skilled in the art will appreciate that the type of corrugated fiberboard shown in FIG. 1 and 2 is known to the trade as double faced corrugated fiberboard since a medium sheet is combined with a so-called inner and so-called outer liner.

Single faced corrugated fiberboard is made by using a single corrugated medium member and a single liner member; double wall corrugated fiberboard comprises three liners with two corrugated medium members alternatively spaced between the liners; and triple wall corrugated fiberboard comprises seven thicknesses and is made by bonding two single faced boards into a double faced board in which there are four liners and three corrugated medium members. All such corrugated fiberboard constructions are within the contemplation of the present invention.

EMBODIMENTS

The following examples are set forth to illustrate more clearly the principles and practice of this invention to one skilled in the art and they are not intended to be restrictive but merely to be illustrative of the invention herein contained. All parts are parts by weight unless otherwise indicated.

The following examples illustrate resin systems and adhesive systems suitable for use in making products of this invention. Each such system has characteristics as above indicated as being useful in the manufacture of the products of this invention.

EXAMPLE A

An aqueous aminoplast containing phenol-aldehyde resin is made according to the teachings of example II of U.S. Pat. No. 3,004,941. The aminoplast is dicyandiamide. In the resin is dissolved 4 weight percent of ammonium chloride (based on total resin solids).

EXAMPLE B

An aqueous aminoplast containing phenol-aldehyde resin is made according to the teachings of example II, part B of U.S. Pat. No. 3,331,885. The aminoplast is melamine. In this resin is dissolved 3 weight percent of ammonium chloride (based on total resin solids).

EXAMPLE C

An aqueous aminoplast containing phenol-aldehyde resin is made according to the teachings of example II, U.S. Pat. No. 3,444,119. The aminoplast is urea and dicyandiamide. In this resin is dissolved 2 weight percent of ammonium chloride and 1 weight percent of ammonium sulfate (based on total resin solids).

EXAMPLE D

An aqueous aminoplast containing formaldehyde resin is made as follows:

In a reaction kettle is placed 200 parts by of 50 weight percent formalin. To the formalin is added 0.43 parts by weight glacial acetic acid solution. The resulting mixture is neutralized with 33 weight percent aqueous potassium hydroxide solution, and has 7.0 pH ranging from about 6.4 to 7.0. Next, to the mixture is added 100 parts by weight of crystalline urea and the mixture is added 100 parts by weight of crystalline urea is heated to atmospheric reflux temperatures for about 2 hours. Thereafter, the mixture is cooled to 40° C. and neutralized with about a 33 weight percent potassium hydroxide solution to produce a product mixture having a pH of about 7.0 to 8.0. This product mixture is dehydrated under vacuum to the desired solids level (see below). The yield of urea-formaldehyde resinous product is about 225 weight percent (based on starting urea). This product urea-formaldehyde resin has the following characteristics:

| | |
|---|---|
| Total solids | 67–69% |
| | 1,000–2,400 cps. |
| Free-formaldehyde (sodium sulfite method) | 3.0–6.0% |
| pH at 25° C. | 7.2–8.2 |
| Refractive index at 25° C. | 1.4900–1.4950 |
| Water dilutability | 7.5 to 1 |
| Total nitrogen content | 18–24% |

To prepare an aminoplast containing resin, 100 parts of the above resins are mixed with 100 parts of the phenol-formaldehyde resole resin prepared in example F (below).

EXAMPLE E

An aqueous aminoplast-containing resin is made as follows:

To 100 parts of phenol in a reaction kettle are added first 180 parts of 50 percent formalin and then 4 parts of sodium hydroxide sufficient to bring the pH to about 8.6. The mixture is refluxed for about 3 hours at about 65° C., while maintaining a reaction pH of about 8.6. Thereafter, this mixture is cooled to about 40° C. This mixture is then neutralized to a pH of about 7.0 with aqueous diluted hydrochloric acid. The resulting mixture is dehydrated under vacuum to the desired solids level (see Table A below). The product yield is about 270 weight percent based on starting phenol. The product has a water solubility such that a 55 weight percent aqueous solution of resole resin solids can be prepared. The resin characteristics are summarized in table A below.

Next, a solution comprising 30 parts by weight of urea, and 10 parts by weight of ammonium chloride both dissolved in 60 parts of water is prepared.

A resin system treating solution is made by diluting 50 parts of the resin with 25 parts of water and then adding thereto 8 parts of the modifier solution. The product resin system comprises (on a 100 dry weight percent basis) about 84 weight percent phenol-formaldehyde resole resin; about 4 weight percent ammonium salt, and about 12 weight percent urea. The system has a pH of about 1.5 when in the form of an aqueous solution of about 35 weight percent total resin system solids. As thus made, however, this system contains about 30 weight percent total resin system solids with the balance up to 100 weight percent being water.

EXAMPLE F

An aqueous aminoplast containing resin is made as follows:

To 100 parts of phenol in a reaction kettle are added first 170 parts of 50 percent formalin and the 6 parts of calcium hydroxide sufficient to bring the pH to about 8.6. The mixture is refluxed for about 4 hours at 62°— C. Thereafter, the mixture is cooled to 40° C. The mixture is then neutralized to a pH of 7.2 with carbon dioxide. The resin is filtered to remove the calcium carbonate. The product has a water solubility such that a 55 weight percent aqueous solution of resole resin solids can be prepared. The resin characteristics are summarized in table A below.

Next, there is prepared a solution comprising 400 parts by weight of urea, and 150 parts by weight of ammonium chloride in 600 parts be weight of water.

A resin system treating solution is made by diluting 100 parts of the resin with 100 parts of water and adding thereto 12 parts of the modifier solution. The product resin system comprises (on a 100 dry weight percent basis) about 20 weight percent phenol-formaldehyde resole resin; about 1.5 weight percent ammonium salt, and about 3.5 weight percent urea. The system has a pH of about 2.0 when in the form of an aqueous solution of about 35 weight percent total resin system solids. As thus made, however, this system contains about 25 weight percent total resin system solids, with the balance up to 100 weight percent being water.

EXAMPLE G

An aqueous aminoplast containing resin is made as follows:

To 100 parts phenol in a reaction kettle are added 150 parts of 50 percent formalin and 4 parts triethylamine amine as a catalyst. The mixture is refluxed at about 70° C. for about 4 hours until a free formaldehyde end point of 8.6 percent is reached. The resin product is then cooled to 30° C. It has a solids content of about 48.0 weight percent. The product has a water solubility such that a 55 weight percent aqueous solution of resole resin solids can be prepared. The resin characteristics are summarized in table A below.

Next, there is prepared a solution comprising 50 parts by weight of urea and 30 parts by weight ammonium sulfate in 100 parts by weight water.

A resin system treating solution is made by diluting 100 parts of the resin with 100 parts of water and adding thereto 20 parts of the modifier solution. The product resin system comprises (on a 100 dry weight percent basis) about 20 weight percent phenol-formaldehyde resole resin; about 1.5 weight percent ammonium salt, and about 4.0 weight percent urea. The system has a pH of about 2.2 when in the form of an aqueous solution of about 35 weight percent total resin system solids. As thus made, however, this system contains about 25 weight percent total resin system solids with the balance up to 100 weight percent being water.

TABLE A

| | Example E | Example F | Example G |
|---|---|---|---|
| Total resin solids in aqueous solution | 55 | 50 | 48 |
| Free Formaldehyde[1] | 9 | 6 | 8.5 |
| pH[2] | 7 | 7.2 | 8.0 |
| Combined average moles formaldehyde per aromatic ring[3] | 2.25 | 2.25 | 2.15 |
| Ash content[4] | 2.3 | 0.3 | 0 |

[1] Free formaldehyde content determined by the so-called hydroxylamine hydrochloride method.
[2] pH measured at 25° C. using an aqueous solution of about 35 weight percent total resin solids.
[3] Measured by methylol content and methylene bridges per aromatic ring using nuclear magnetic resonance on a sample of product.
[4] Ash content determined using a 35 weight percent aqueous solution of total resins at 150° C. at 2 hours and thereafter pyrolyzed for 24 hours at 540° C.

EXAMPLE H

A polyvinyl alcohol adhesive as described in example 1 of U.S. Pat. No. 3,324,065 is prepared.

EXAMPLE I

A polyvinyl alcohol adhesive as described in example 1 of U.S. Pat. No. 3,320,200 is prepared.

EXAMPLE J

A polyvinyl alcohol adhesive as described in example 2 of U.S. Pat. No. 3,135,648 is prepared.

EXAMPLE K

A polyvinyl alcohol adhesive as described in example E (col. 4, lines 40–64) of U.S. Pat. No. 3,371,004 is prepared.

The following examples illustrate the manufacture of corrugated fiberboard of the present invention using the above-described resole resins and adhesive systems.

EXAMPLE 1

Each side of a 26 pound basis weight medium paper sheet about 0.009 inch thick are roller coated with aminoplast containing phenol-aldehyde resin system of example A to a total resins content of about 8 weight percent based on the dry weight of the sheet plus resin. One side of a 42 pound basis weight kraft liner paper sheet about 0.012 inch thick is roller coated with the same resin system to a total resins content of 4 percent based on the dry weight of the sheet plus resin. The so-treated medium sheet and liner sheet are each dried to a total volatiles content of about 6 percent (as indicated by drying the paper to 160° C. for 10 minutes to determine weight loss).

Next, a medium sheet as so prepared in corrugated into type B flutes of about 50 per foot, and the polyvinyl alcohol adhesive of example H is applied to the tips of he flutes of the medium corrugations at the rate of about 8 pounds adhesive solids per 1,000 ft.$^2$ of product fiberboard. This medium is then combined with two pieces of such liner sheet as prepared above one on each side of the adhesive treated medium sheet so as to form a corrugated fiberboard. This board is now exposed to a temperature of about 160° C. for about 20 seconds to dry and set the adhesive. This product can be considered to be an intermediate corrugated fiberboard product which may be converted as herein below described into a corrugated fiberboard product of this invention.

One portion of this intermediate product board is exposed to about 180° C. for about 4 minutes to thermoset the treating resin and, thereby, produce product corrugated fiberboard of this invention. This fiberboard is then converted into a first set of box blanks by cutting, slotting, and scoring.

A second portion of this intermediate product board is converted into a similar but second set of box blanks by cutting, slotting, and scoring. These blanks are then exposed to about 180° C. for about 4 minutes to thermoset the treating resin and thereby produce product corrugated fiberboard of this invention.

The first and the second box blanks are then formed into containers, and each such respective container is compression tested for dry and wet strength (top to bottom) using ASTM Test Procedure No. D–642–47. A container of similar dimensions is made from a blank composed of conventional untreated medium and liner members and the adhesive of example H. The compression tests are conducted on containers which are exposed before testing to 50 percent relative humidity for 24 hours at about 22° C. and also to a water immersion for 24 hours at about 22°— C. The results show that the treated containers retain 30 to 40 percent of their original compression strength after water immersion whereas the untreated containers retain substantially no compression strength after water immersion.

Samples of corrugated board from the first box blanks, and samples of corrugated board from the second box blanks are tested, along with samples of corrugated board from the untreated box blanks, for flat crush resistance before and after water immersion using ASTM Test Procedure D–1225–54. The results show that the treated board retains substantial strength after water immersion whereas the untreated board retains substantially no strength after water immersion.

EXAMPLE 2

Using the procedure employed in example 1 to make the second blanks of that example, but instead employing as the medium one having type C flutes and using a 33 pound basis weight paper 0.011 inch thick having a 10 weight percent treating resin content and a 7 percent volatiles content, and further employing as the liner a 69 pound basis weight paper 0.020 inch thick having a 5 weight percent treating resin content and an 8 percent volatiles content, blanks and then containers are made and similarly compression tested (top to bottom). The treated containers display excellent compression strength after water immersion. Samples of the treated corrugated board used in such blanks are similarly (as in example 1) evaluated for flat crush resistance and are found to have excellent flat crush resistance after water immersion.

EXAMPLE 3

Using the procedure employed in example 1 to make the second blanks of that example, but instead employing as the medium one having type C flutes and using a 33 pound basis weight paper 0.009 inch thick impregnated with 10 weight percent of the resin treating solution of example B and dried to a 5 percent volatiles content, and instead employing and untreated liner paper having a 42 pound basis weight and a thickness of 0.012 inch. The product board is heated to 180° C. for 10 seconds, and then is cut, scored, and slotted to form a box blank. The product blank is heated in a forced draft oven for 2 minutes at 200° C. to complete resin curing. The product blanks are formed into containers and evaluated for compression strength as in example 1, and board used in the blanks is evaluated for flat crush resistance as in example 1. The results show the product board and blank to have excellent flat crush resistance and excellent compression strength, respectively, after water immersion.

EXAMPLES 4 through 8 Using the procedure employed in example 1 to make the first board and blanks there described, a series of corrugated box blanks are, made, and evaluated as in example 1. In each case, the medium, the liner, the treating resin and the adhesive are as described in table III below. The corrugated board and blanks made therefrom display excellent crush resistance after water immersion evaluated by the procedures described in example 1 above.

TABLE III

| Ex. No. | Medium [1] Thickness (in inches) | Basis weight | Liner Thickness (in inches) | Basis weight | Ex. No. | Treating resin system Amount in medium, percent Resin | Vol. | Amount in liner, percent Resin | Vol. | Ex. No. | Amount adhesive applied [2] |
|---|---|---|---|---|---|---|---|---|---|---|---|
| 4 | .009 | 26 | .020 | 69 | C | 12 | 8 | 3 | 5 | H | 6 |
| 5 | .011 | 33 | .020 | 69 | D | 10 | 6 | 7 | 8 | I | 6 |
| 6 | .011 | 33 | .020 | 69 | E | 12 | 7 |   |   | J | 6 |
| 7 | .009 | 26 | .020 | 69 | F | 12 | 8 | 3 | 5 | H | 6 |
| 8 | .009 | 26 | .020 | 69 | G | 11 | 5 | 5 | 5 | K | 6 |

[1] Flutes in corrugated medium are Type B (about 50 per foot).
[2] Lbs. adhesive solids/1000 ft.$^2$ of product board.

What is claimed is:

1. A corrugated fiberboard construction adapted to be rigid when wet comprising:
   A. as a medium, a corrugated cellulosic sheet member having a thickness of from about 7 to 15 thousandths of an inch and a basis weight of about 25 to 36 pounds per 1,000 sq. ft., said sheet member containing from 5 to 15 weight percent (dry weight basis) of an aminoplast containing phenol-aldehyde resin system said sheet member having a total volatiles content of from about 3 to 10 weight percent, said aminoplast containing resin being selected from the group consisting of (a) condensation reaction products of phenol, formaldehyde, and at least one aminoplast selected from the group comprising of urea, melamine, and dicyandiamide and (b) compositions comprising a phenol-formaldehyde resole resin and at least one such aminoplast, said aminoplast containing resin being further characterized by having (1) a mol ratio of combined formaldehyde to phenol ranging from about 1.0 to 3.0; (2) a total nitrogen content ranging from about 3 to 20 weight percent (based on total dry resin weight); and (3) a water solubility such that at least about a 30 percent aqueous solution of resin solids can be prepared,
   B. as a liner, a cellulosic sheet member having a thickness of from about 5 to 30 thousandths of an inch and having a basis weight of from about 25 to 120 pounds per 1,000 sq. ft.
   C. as a bonding composition, a polyvinyl alcohol adhesive system containing from about 2.5 to 35 weight percent of substantially fully hydrolyzed polyvinyl alcohol having a molecular weight such that a 4 weight percent aqueous solution thereof has a viscosity at 20° C. of from about 5 to 125 centipoises with the balance up to 100 weight percent (dry weight basis) being selected from the group consisting of supplemental binders, fillers and adjuvants, said adhesive system having a post water soak, paper to paper fiber tearing bond,
   D. said corrugated medium sheet member being positioned adjacent said liner sheet member and being bonded thereto at positions of mutual contact therebetween by said bonding composition, and
   E. such resulting construction having been subjected to a temperature of from about 120° to 200° C. for, times of from about 5 seconds to 5 minutes.

2. A construction of claim 1 which has been subjected to temperatures and times sufficient to substantially completely thermoset said aminoplast containing phenol-aldehyde resin system.

3. A box blank prepared from a corrugated fiberboard construction of claim 1.

4. A box blank prepared from a corrugated fiberboard construction of claim 2.

5. The box blank of claim 3 wherein said blank has been subjected to temperatures and times sufficient to substantially completely thermoset and aminoplast-containing phenol-aldehyde resin system.

6. A construction of claim 1 wherein said liner member is treated with from about 2 to 10 weight percent (dry weight basis) with a said aminoplast containing resin and has a total volatiles content of from about 3 to 10 weight percent.

7. A construction of claim 6 which has been subjected to combination of temperatures and times sufficient to substantially completely thermoset said aminoplast-containing phenol-aldehyde resin system.

* * * * *